Nov. 21, 1939.  E. A. SCHUMACHER ET AL  2,180,839

PRIMARY CELL

Filed June 17, 1937

INVENTORS
ERWIN A. SCHUMACHER
GEORGE W. HEISE
BY
ATTORNEY

Patented Nov. 21, 1939

2,180,839

UNITED STATES PATENT OFFICE 2,180,839

PRIMARY CELL

Erwin A. Schumacher, Lakewood, and George W. Heise, Rocky River, Ohio, assignors to National Carbon Company, a corporation of Ohio Application June 17, 1937, Serial No. 148,630

7 Claims. (Cl. 136—136)

The invention relates to primary galvanic cells, and more specifically to a primary cell having an alkaline electrolyte, a soluble metal anode, and a porous carbon cathode, wherein cathodic depolarization is effected by transfer of oxygen from the air through the porous carbon cathode to the cathodic polarizing region.

An object of the invention is to provide an air depolarized cell having a nonspillable or immobilized electrolyte. Another object is an air depolarized cell having improved life, improved service characteristics, and increased compactness. A further object is an air depolarized battery of flat layer type of construction. Another object is to provide an electrolyte having a regenerating substance uniformly distributed therein. Other objects will become apparent as the following description of the invention proceeds.

One feature of this invention is an air depolarized cell having a nonspillable or immobilized alkaline electrolyte comprising aqueous alkali and a gel or paste forming material. The alkali may be any suitable material of this description, for instance, sodium hydroxide. The gel or paste material may likewise be any of a large number of such materials for example, cereal, starch, or cellulose pulp, or inorganic gels such as $Mg(OH)_2$ or $Ca(OH)_2$, which do not deleteriously affect the active ingredients of the electrolyte.

In a preferred form of the invention, the nonspillable or immobilized electrolyte contains dispersed, and preferably uniformly distributed, electrolyte-regenerating material. For instance, if the active ingredient of the electrolyte is sodium hydroxide, and the soluble anode is zinc, comminuted alkaline earth, zeolite, or bentonite, may be dispersed in the electrolyte to react with the zinc compounds of sodium formed in the cell reactions, and thereby to form insoluble zinc compounds and to regenerate the sodium hydroxide for reuse in the main cell reactions.

The following composition is an example of a gel immobilized electrolyte which behaves effectively, the ingredients being heated and mixed, and the mixture cooled to form a gel:

| | Parts |
|---|---|
| Starch, e. g. corn starch | 15 to 30 |
| Slaked lime, $Ca(OH)_2$ | 50 to 200 |
| Caustic soda, NaOH | 200 to 250 |
| Water | 1000 |

A suitable paste immobilized electrolyte may be made by cold-mixing the same ingredients, but using a larger proportion of starch, say 30 to 60 parts of corn starch. The paste forms a more rigid mass, and is preferred for small cells which receive considerable handling.

An inorganic type of paste electrolyte may be formed by mixing say 70 grams of $MgSO_4 \cdot 7H_2O$ with 31 grams of solid NaOH, triturating the resulting mixture with 160 cc. of aqueous NaOH solution containing 231 grams of NaOH per liter, and then stirring into the wet paste 25 grams of $Ca(OH)_2$.

Typical embodiments of our invention are illustrated in the accompanying drawing, in which.

Figure 1:
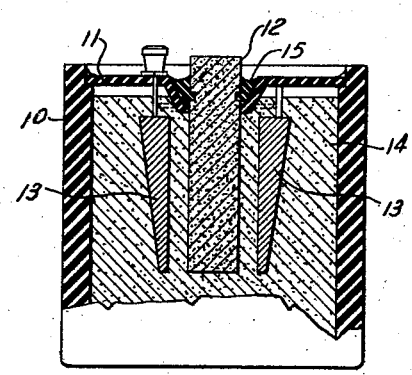
Figure 1 is a partial cross section of one form of an air depolarized primary cell containing a nonspillable electrolyte.

The cell illustrated in Figure 1 comprises a container 10 provided with a cover 11. Within the container 10 are a zinc electrode 13 and a porous carbon electrode 12, the latter protruding through an aperture in the cover 11 and sealed therein by a thermoplastic material 15. A nonspillable electrolyte 14 surrounds the electrodes 12 and 13. This embodiment of the invention resembles the conventional liquid-electrolyte air depolarized cell in the general arrangement of parts.

The porous carbon cathode should be repellent to electrolyte but pervious to oxygen. Electrolyte repellent porous carbon cathode materials, pervious to oxygen, are well known in the art and need not be further described here.

The cathode should make good contact with the electrolyte despite the repellent nature of the cathode material. In the present invention, good contact is assured by pretreating the cathode surface with hot liquid electrolyte, hot concentrated sodium hydroxide solution for instance, by spraying, brushing, or other suitable method of thoroughly wetting the surface.

Figure 2:
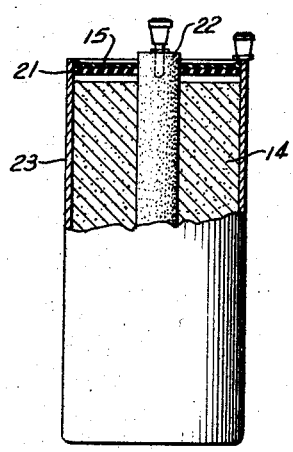
Figure 2 is a partial cross section of an alternative form of cell in which the anode forms the cell container.

The embodiment shown in Figure 2 adopts the general shape of a conventional dry-cell, and comprises an outer zinc electrode 23, forming a container, a centrally located porous carbon electrode 22, and a nonspillable electrolyte 14. The top of the cell may be closed with a washer-shaped cover 21 and thermoplastic sealing material 15.

Figure 3:
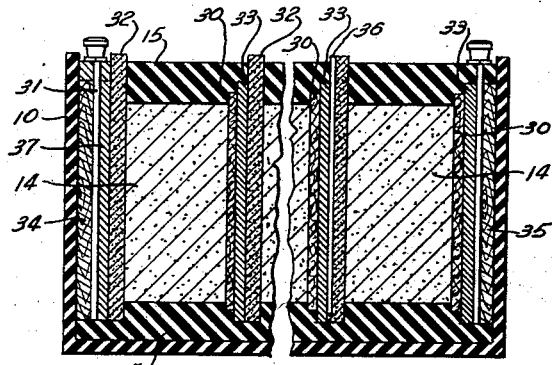
Figures 3 and 4 are cross sections of air depolarized primary batteries in a flat layer arrangement of cells.
Figure 4:
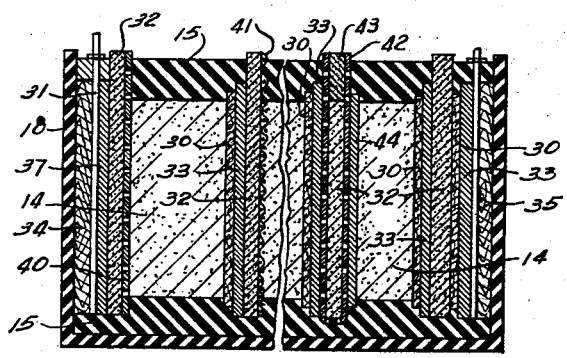

The embodiment shown in Figures 3 and 4 is a flat layer type of battery, comprising a series of individual cells containing a porous carbon electrode 32, a nonspillable electrolyte 14, a separator 30, and a zinc electrode 33. Electrical connection between adjacent cells may be made by direct contact of the zinc of one cell with the carbon of the next cell. The electrical connection to the end carbon electrode may similarly be made through a zinc plate 37 and a wire 31. Insulating sheets 34 and 35 may be used at each end of the battery, and the top and bottom of the battery may be closed and sealed with thermoplastic material 15.

Contact between the nonspillable electrolyte 14 and the zinc electrode 33 is improved, and the service output of the battery is increased, if the separator 30 comprises cellulose treated with a caustic soda solution and impregnated with a sodium silicate solution. Contact between the electrolyte 14 and the carbon electrode 32 is similarly improved if the latter is treated with hot caustic soda solution as described above. Contact between the zinc electrode 33 and the carbon electrode 32 may be improved by the use of a cement comprising for example, 2 parts graphite, 1 part rosin, and 1/3 part boiled linseed oil.

The use of separators 30 and a relatively large body of electrolyte material 14, as shown in Figure 3, permits anodic reaction products to diffuse to some substantial distance from the zinc 33 before precipitating, thereby decreasing the "choking" effect of the precipitate. However, as shown in the cell to the extreme right of Figure 4, the separator 30, of pulp, paste, or gel, may serve as the sole body of electrolyte.

The permissible current drain and the service life of the battery may be increased by the use of a porous carbon electrode provided with one or more ventilating holes or grooves 36 (Figure 3) which provide more ready access of air to those portions of the electrode remote from the protruding edge of the electrode.

Contact between the carbon electrode 32 and the electrolyte 14 may be further improved, as shown in Figure 4, by the use of a metal (iron for example) perforated sheet 40 or wire screen 41 next to the carbon. The perforated sheet or screen may surround the electrode as a sheath or basket 42. These constructions are particularly useful when the carbon electrodes 32 consist of unbonded, or weakly bonded, granular carbon. Unbonded carbon tends to sift through the openings of the sheet, screen, or basket, and this tendency may be counteracted, if desired, by the use of a separator 44 as shown on the electrolyte side of the basket 42. In some instances, the separator 44 may be used instead of the basket 42. Loss of carbon grains through the top of the basket may be prevented by a porous cap or plug 43.

Other embodiments of the invention will readily occur to those skilled in the art, and those described above are illustrative examples.

The use of an immobilized or nonspillable electrolyte has many practical advantages in addition to that of the inherently greater convenience of handling a "dry" cell construction. The paste or gel electrolyte is slower than a liquid electrolyte to penetrate into the pores of the carbon cathode, and, if an unbonded carbon cathode is used, the paste or gel hinders the sifting of carbon through the openings in the screen or basket 43. Furthermore, the paste or gel electrolyte can hold in suspension the electrolyte regenerating material described above, thereby making the latter more readily available for reaction and more effective; moreover, a relatively large proportion of regenerator may be used, thereby increasing the service output of the cell.

It will readily be apparent that many of the features of the invention which have been illustrated in connection with the flat layer type of battery, such as the use of unbonded carbon, ventilated cathodes, separators, screens, and baskets, may also be used in other types of cells and batteries, for instance in the types shown in Figures 1 and 2.

We claim:

1. A primary galvanic cell comprising an anode of metal soluble in alkaline electrolyte; a porous carbon cathode capable of transferring oxygen from the air to the cathodic polarizing region; an alkaline electrolyte in contact with the anode and cathode; electrolyte-immobilizing material in admixture with the electrolyte; and solid electrolyte-regenerating material dispersed in said electrolyte.

2. A primary galvanic cell comprising a zinc anode; a porous carbon cathode capable of transferring oxygen from the air to the cathodic polarizing region; an electrolyte comprising sodium hydroxide in contact with the anode and cathode; electrolyte-immobilizing material selected from the group consisting of cereals, starch, and cellulose pulp, in admixture with the electrolyte; and solid electrolyte-regenerating material, selected from the group consisting of alkaline earths, zeolites, and bentonite, dispersed in said electrolyte.

3. A cell as defined in claim 3, whereupon a separator composed essentially of caustic-treated cellulose impregnated with sodium silicate is provided between the anode and cathode.

4. A cell as defined in claim 2, wherein the cathode is composed of unbonded granular carbon and is at least partially surrounded by an electrolyte-pervious member.

5. In a cell as defined in claim 2, a porous carbon cathode the surface of which is initially in intimate contact with concentrated alkali.

6. A battery comprising a plurality of the cells defined in claim 2 connected in series, the anode and cathode of each cell being in the shape of flat plates or strips, and electrical connection between adjacent cells being made by electrical contact of a face of the anode or cathode of each of said adjacent cells with a face of the cathode or anode, respectively, of the next adjacent cell.

7. A battery comprising a plurality of the cells defined in claim 2 connected in series, the anode and cathode of each cell being in the shape of a flat plate or strip, and electrical connection between adjacent cells being made by electrical contact of a face of the anode or cathode of each of said adjacent cells with a face of the cathode or anode, respectively, of the next adjacent cell, and said contact being improved by an electrolyte-impervious layer of conductive bonding material.

ERWIN A. SCHUMACHER.
GEORGE W. HEISE.

CERTIFICATE OF CORRECTION.

Patent No. 2,180,839.　　　　　　　　　　　　　November 21, 1939.

ERWIN A. SCHUMACHER.

It is hereby certified that error appears in the printed specification of the above numbered patent requiring correction as follows: Page 2, second column, line 40, claim 3, for "3, whereupon" read 2, wherein; and that the said Letters Patent should be read with this correction therein that the same may conform to the record of the case in the Patent Office.

Signed and sealed this 26th day of December, A. D. 1939.

(Seal)　　　　　　　　　　　　　　　　　　　　　Henry Van Arsdale,
　　　　　　　　　　　　　　　　　　　　　Acting Commissioner of Patents.